United States Patent
Shirato et al.

(10) Patent No.: US 6,330,175 B2
(45) Date of Patent: Dec. 11, 2001

(54) POWER SUPPLY APPARATUS FOR ELECTRONIC UNIT

(75) Inventors: Keiji Shirato; Tetsuya Kimoto, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/774,767

(22) Filed: Jan. 31, 2001

(30) Foreign Application Priority Data

Feb. 2, 2000 (JP) .................................................. 12-030241

(51) Int. Cl.⁷ ........................................................ H02M 5/42
(52) U.S. Cl. ............................................................... 363/89
(58) Field of Search ................................. 363/89, 97, 98, 363/21.1, 34, 37, 39, 40

(56) References Cited

U.S. PATENT DOCUMENTS

| | | | |
|---|---|---|---|
| 4,807,102 | * 2/1989 | Serras-Paulet | 363/37 |
| 5,325,209 | * 6/1994 | Manabe | 358/437 |
| 5,729,667 | * 3/1998 | Lee | 395/113 |
| 5,864,221 | * 1/1999 | Downs et al. | 320/134 |

* cited by examiner

Primary Examiner—Rajnikant B. Patel
(74) Attorney, Agent, or Firm—Jay H. Maioli (57) ABSTRACT

When an electronic unit is in a standby state, a standby circuit, such as a control microcomputer which receives a signal from a remote-control transmitter, is operated by an electric power supplied from an electricity accumulating section built in a power-supply circuit to make power consumption to zero in the standby state.

10 Claims, 5 Drawing Sheets

POWER SUPPLY APPARATUS FOR ELECTRONIC UNIT

BACKGROUND OF THE INVENTION

1. Field of the Invention

The present invention relates to power supply apparatuses for electronic units, and more particularly, to a power supply apparatus effective for an electronic unit, having a main power-supply section for driving the electronic unit and a standby power-supply section enabled when the electronic unit is not operating.

2. Description of the Related Art

Each of many electronic units available these days is provided with a receiving section for receiving light modulated, for example, by an infrared ray, is provided with a remote-control function for operating the power supply of the electronic unit by receiving the infrared ray emitted from a remote-control transmitter, and is provided with a power supply for holding data, such as the ON/OFF state of the power supply of the electronic unit, a timer of the electronic unit, and last-operation information, as a standby power supply.

Various standby power supplies are available as follows;
1) Those which use a transformer in a main circuit and output a standby power at a secondary side
2) Those which use a compact standby transformer In standby power supplies 1) and 2), since transformers are always energized, much electric power is consumed at standby.

3) Those which accumulate electric power for operating a standby circuit, in a power-supply circuit and achieve charging when the accumulated electric power is running out. Standby power supplies 3) have less power consumption than power supplies 1) and 2), but require electric power for charging.

4) Those which accumulate electric power for operating a standby circuit, in a power-supply circuit in the same way as those described in 3), do not achieve charging when the accumulated electric power is running out, and become an operation-impossible state. Standby power supplies 4) do not require electric power at standby, but whether they are on standby cannot be externally determined.

SUMMARY OF THE INVENTION

An object of the present invention is to reduce the consumption of a standby electric power for an electronic unit as much as possible and to allow the user to easily determine whether a standby power supply for the electronic unit is on.

To eliminate the foregoing drawbacks, a first form of the present invention provides a power-supply apparatus for an electronic unit, including a power-supply section to which a commercially-available alternating power source (hereinafter just called AC) is supplied through contacts of an electromagnetic relay and a power-supply switch provided with a button section which reports a status change by moving in a predetermined direction and which opens and closes contacts and a driving section for returning the button section moved in the predetermined direction; an electricity accumulating section charged by the power-supply section, for supplying accumulated electric power; and a control section for controlling the electromagnetic relay to stop the supply of the AC to the power-supply section when the control section decodes a control signal and determines that the signal indicates a power-supply-stop instruction, for receiving electric power from the electricity accumulating section to enter a standby state, and for controlling the driving section of the power-supply switch to return the button section when a voltage sent from the electricity accumulating section decreases.

A second form of the present invention provides a power-supply apparatus for an electronic unit, including a power-supply section connected to the AC through contacts of an electromagnetic relay and a power-supply switch provided with a button section which reports a status change by moving in a predetermined direction and a driving section for returning the moved button section; an electricity accumulating section charged by the power-supply section; an A-D conversion section for converting a voltage sent from the electricity accumulating section to a digital value: and a control section for controlling the electromagnetic relay to stop the supply of electric power from the power-supply section when the control section decodes a remote-control signal and determines that the signal indicates a power-supply-stop instruction, for receiving electric power from the electricity accumulating section to enter a standby state, and for controlling the driving section of the switch to move the button section in the opposite direction when a sent voltage decreases.

With the foregoing structures in the first and second forms of the present invention, when a standby electric power runs out, since the control section returns the button of the power-supply switch, the user can determine whether the electronic unit is remote-controllable.

A third form of the present invention provides a power-supply apparatus for an electronic unit, including a first instantaneous-operation switch connected in parallel to the contacts of the electromagnetic relay, for closing contacts only for a predetermined time period in an interlocking manner when the power-supply switch is turned on, to supply the AC to the power-supply section; and a second instantaneous-operation switch for closing contacts only for a predetermined time period in an interlocking manner when the power-supply switch is turned on, to send a voltage to the control section.

A fourth form of the present invention provides a power-supply apparatus for an electronic unit, including a storage section for storing and holding the control state of the control section, written when the voltage of the electricity accumulating section becomes equal to or less than a predetermined value, and a first instantaneous-operation switch connected in parallel to the contacts of the electromagnetic relay, for closing contacts only for a predetermined time period in an interlocking manner when the power-supply switch is turned on, to supply the AC to the power-supply section. With the foregoing structures in the third and fourth forms of the present invention, even after the electricity accumulating section is discharged, since the AC is supplied to the power-supply section in an interlocking manner when the power-supply switch is turned on, the electromagnetic relay is driven.

In addition, in the present invention, electric power accumulated in the electricity accumulating section is used to allow standby, and the electricity accumulating section is intermittently charged by the AC supplied to the sub power-supply section, when the accumulated electric power is running out. If the voltage of the electricity accumulating section further decreases because intermittent charging cannot be achieved, since the control section controls the driving section of the power-supply switch to return the button section, the user can determine whether the electronic unit is remote-controllable.

A fifth form of the present invention provides a power-supply apparatus for an electronic unit, including a main power-supply section to which the AC is supplied through contacts of a first relay and a power-supply switch provided with a button section which reports a status change by moving in a predetermined direction and a driving section for returning the button section; a sub power-supply section to which the AC is supplied through contacts of a second relay; an electricity accumulating section charged by the main power-supply section; a voltage detecting section for determining that the voltage sent from the electricity accumulating section has decreased; and a control section for controlling the first relay to stop the supply of the AC when the control section decodes a remote-control signal and determines that the signal indicates a power-supply-stop instruction, and for controlling the second relay to supply the AC to the sub power-supply section to intermittently charge the electricity accumulating section from the sub power-supply section when the voltage of the electricity accumulating section decreases.

A sixth form of the present invention provides a power-supply apparatus for an electronic unit, including a main power-supply section to which the AC is supplied through contacts of a first relay; a sub power-supply section to which the AC is supplied through contacts of a second relay; an electricity accumulating section charged by the main power-supply section, for supplying accumulated electric power; an A-D conversion section for converting a voltage sent from the electricity accumulating section to a digital value; and a control section for controlling the first relay to stop the supply of the AC to the main power-supply section when the control section decodes a remote-control signal and determines that the signal indicates a power-supply-stop instruction, and, when the voltage of the electricity accumulating section decreases, for controlling the second relay to supply the AC to the sub power-supply section in order to intermittently charge the electricity accumulating section from the sub power-supply section.

A seventh form of the present invention provides a power-supply apparatus for an electronic unit, wherein the power-supply switch provided with the driving section for returning the button section is connected in series to the contacts of the second relay.

An eighth form of the present invention provides a power-supply apparatus for an electronic unit, including a storage section for storing and holding the control state of the control section, written when the voltage sent from the electricity accumulating section becomes equal to or less than a predetermined value; a first instantaneous-operation switch connected in parallel to the contacts of the second relay, for closing contacts in an interlocking manner only for a predetermined time period in which the power-supply switch is on, to supply the AC to the sub power-supply section; and a second instantaneous-operation switch for closing contacts in an interlocking manner only for a predetermined time period in which the power-supply switch is on, to send a predetermined voltage to the control section.

A ninth form of the present invention provides a power-supply apparatus for an electronic unit, including a first instantaneous-operation switch connected in parallel to the contacts of the second relay, for closing contacts in an interlocking manner only for a predetermined time period in which the switch is on, to supply the AC to the sub power-supply section; and a second instantaneous-operation switch for closing contacts in an interlocking manner only for a predetermined time period in which the power-supply switch is on, to send a predetermined voltage to the control section.

Furthermore, according to the present invention, the control section may be divided into a main control section and a sub standby control section, the sub standby control section having less power consumption than the main control section, which allows a further reduction in standby power consumption.

A tenth form of the present invention provides a power-supply apparatus for an electronic unit, wherein the control section includes a main control section to which electric power is supplied from the sub power-supply section, for controlling the first electromagnetic relay; and a sub control section for decoding a received remote-control signal and for controlling the second relay.

An eleventh form of the present invention provides a power-supply apparatus for an electronic unit, wherein the power consumption of the sub control section is less than that of the main control section.

DESCRIPTION OF THE PREFERRED EMBODIMENTS

Figure 1:
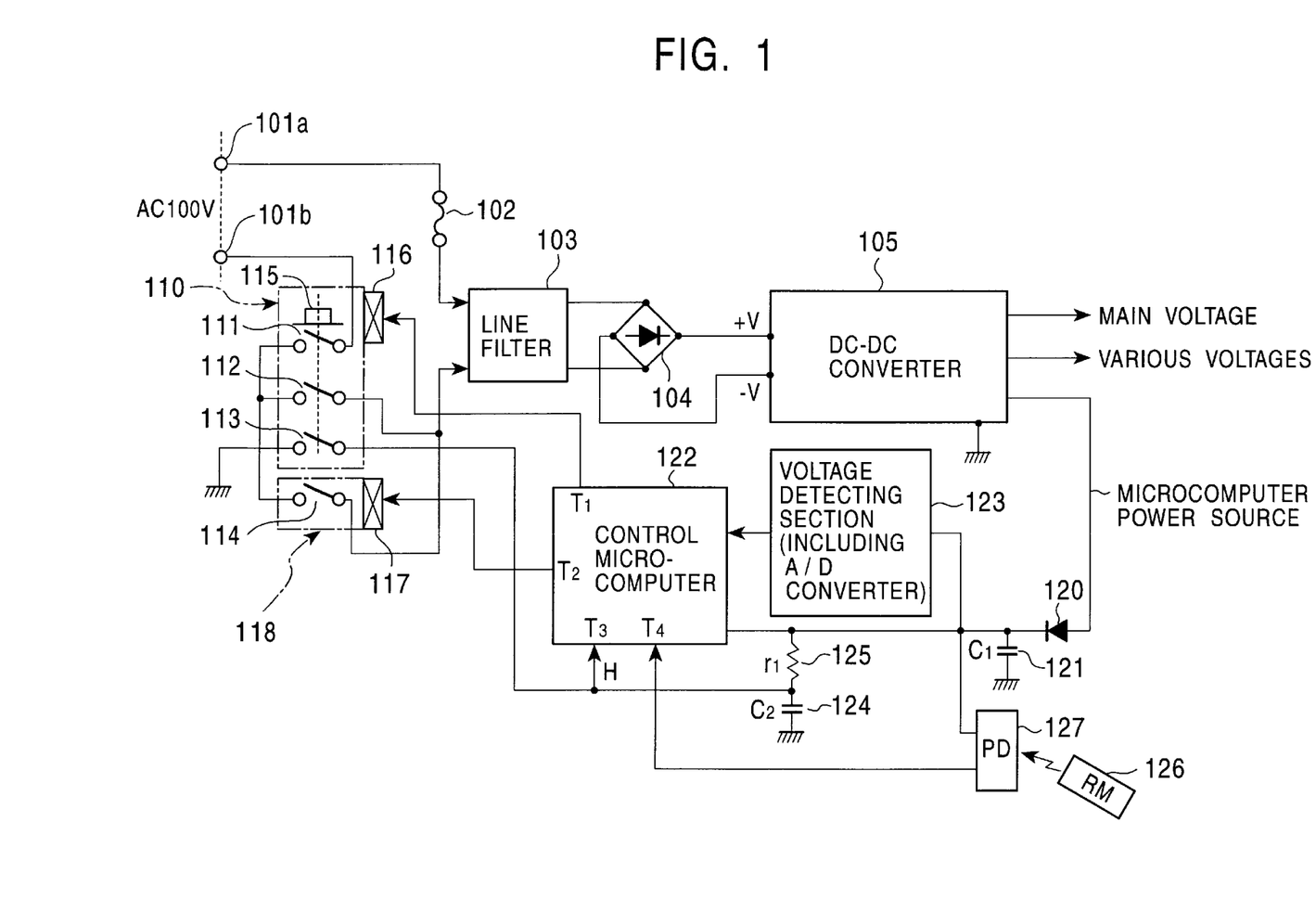
FIG. 1 is a circuit diagram of a power-supply apparatus according to a first embodiment of the present invention.

FIG. 1 is a circuit diagram of a power-supply apparatus for an electronic unit, according to a first embodiment of the present invention. In the present embodiment, an electronic unit which uses a main power supply as a driving power supply is, for example, a TV receiver, a video unit, or a domestic-use electronic unit, and is provided with a standby power supply for setting the electronic unit to a standby state.

The first embodiment will be described below by referring to FIG. 1 and FIG. 2, which is a timing chart of the first embodiment. A commercially-available alternating (AC) power source is supplied to terminals 101a and 101b. The AC power is connected to a line filter 103 through a fuse 102 and a display and power switch 110. The line filter 103 removes common-mode noise leaked to the AC power.

A rectifying circuit 104 for obtaining a DC voltage sends a rectified DC output to a DC-DC converter 105 having the function of a main power supply of, for example, a TV receiver or a video deck having a timer function. Various voltages generated by the DC-DC converter 105 are sent to apparatus sections (not shown) of the electronic unit.

Figure 3A:
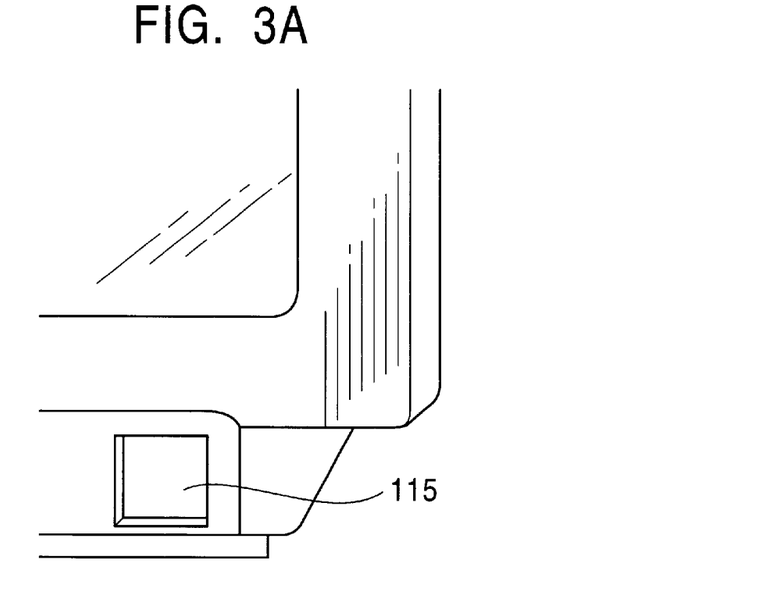
FIGS. 3A and 3B are perspective views showing that a power switch is in an on state and in an off state in the present invention.
Figure 3B:
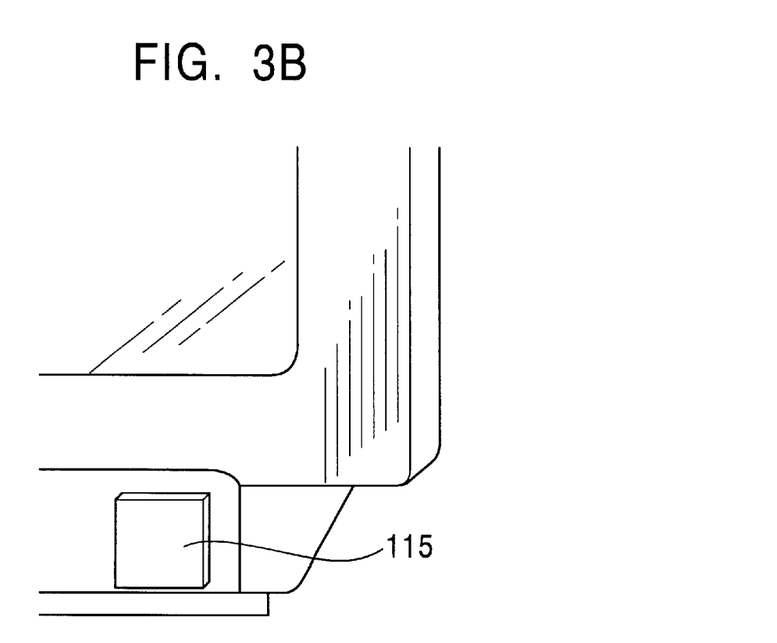

The display and power switch 110 is formed of a main-power-supply switch 111, first and second instantaneous-operation switches 112 and 113, and a push-latching button 115. An electromagnetic relay 118 is provided with contacts 114 which are turned on and off (closed and opened) by a coil 117. The display and power switch 110 has the push-latching button 115 of which a positional change can be recognized when moved in a predetermined direction (in the present embodiment, in a direction in which the push-latching button is pressed toward the body of the electronic unit) (see FIGS. 3A and 3B). When the push-latching button 115 is pressed, the main-power-supply switch 111 and the first and second instantaneous-operation switches 112 and 113 are turned on.

Figure 2:
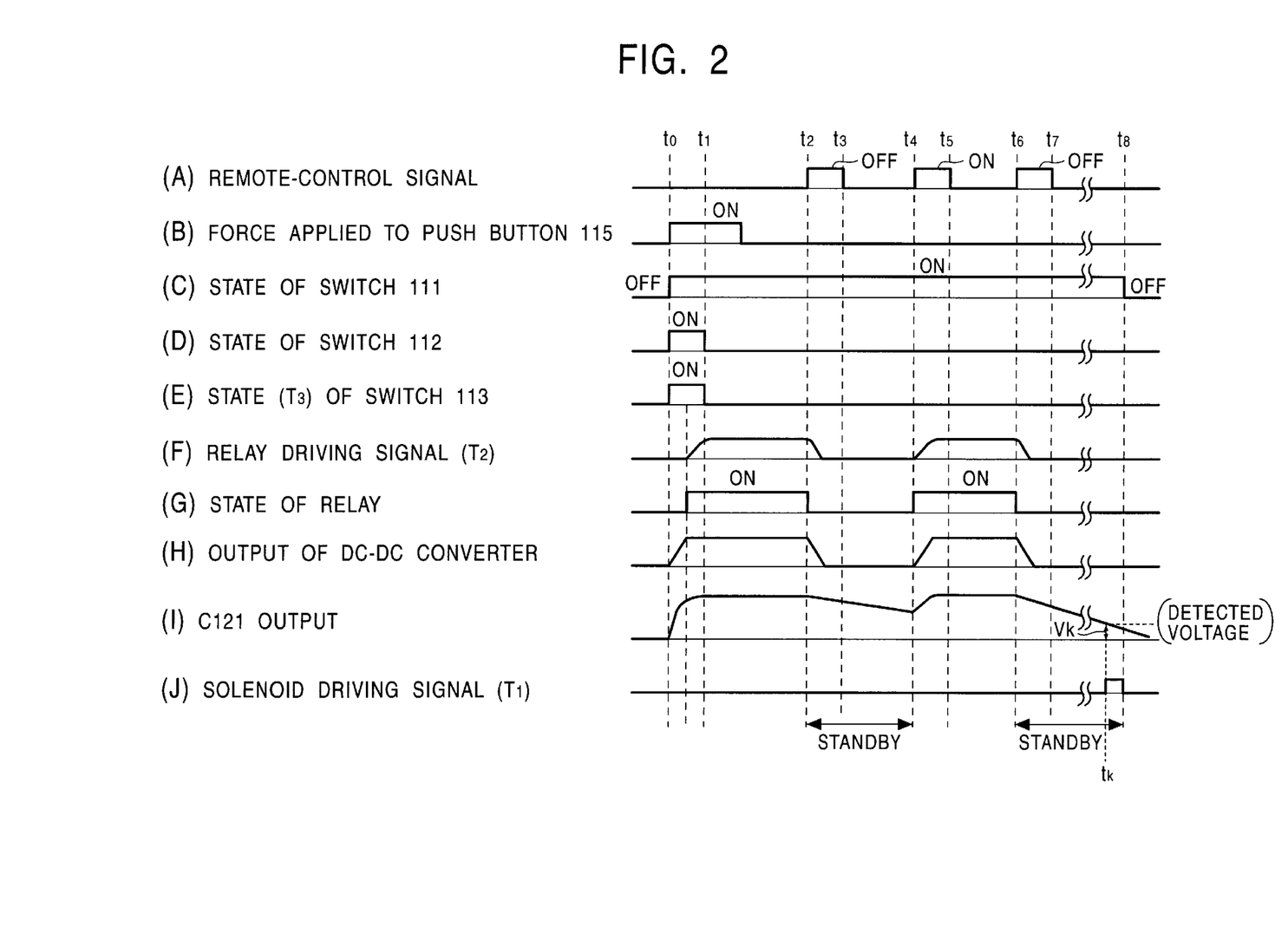
FIG. 2 is a timing chart of an operation according to the first embodiment of the present invention.

In other words, as shown by timing waveforms in FIG. 2, when the push-latching button 115 is pressed (at the point $t_0$ of time in (B) of FIG. 2), the main-power-supply switch 111 is turned on ((C) of FIG. 2). At the same time, the first and second instantaneous-operation switches 112 and 113 are turned on, and are soon turned off (at the point $t_1$ of time in (D) and (E) of FIG. 2). The first and second instantaneous-operation switches 112 and 113 are momentary switches which go on only when the push-latching button 115 is pressed.

A switch driving section 116 is formed of a solenoid which returns the main-power-supply switch 111 to off by a signal sent from a signal terminal $T_1$ of a control microcomputer 122. The signal sent from the signal terminal $T_1$ of the control microcomputer 122 drives the solenoid of the driving section 116 to return the push-latching button 115, and the main-power-supply switch 111 is turned off ((J) of FIG. 2). A voltage detecting section 123 for detecting a voltage sent to the control microcomputer 122 is provided with an A-D converter (not shown) for converting the sent voltage to a digital value. The voltage detecting section 123 converts the voltage rectified and smoothed by a rectifying diode 120 and a capacitor C121 and sent to the control microcomputer 122, to a digital value, and sends it as a digital signal to the control microcomputer 122. The control microcomputer 122 performs control according to the digital signal. For example, the control microcomputer 122 turns off the main-power-supply switch 111 when the driving voltage of the control microcomputer 122 is equal to or less than a predetermined voltage. There are also shown a remote-control transmitter 126 (hereinafter called a remote controller) and a light-receiving section 127 for receiving a signal from the remote controller.

The operation of the first embodiment will be described below by referring to FIG. 1 and FIG. 2.

In the initial condition, it is assumed that all switches are off and an electricity accumulating section formed of the capacitor C121 has no electric power in the power-supply circuit shown in FIG. 1.

When the push-latching button 115 is pressed, the display and power switch 110 is turned on (at the point $t_0$ of time in (B) of FIG. 2). When the display and power switch 110 is turned on, the main-power-supply switch 111 is turned on ((C) of FIG. 2). At the same time, the first and second instantaneous-operation switches 112 and 113 are turned on and are soon turned off (at the point $t_1$ of time in (D) and (E) of FIG. 2).

When the main-power-supply switch 111 and the first instantaneous-operation switch 112 are turned on, a voltage rectified by a diode bridge 104 is applied to the DC-DC converter 105, a voltage for driving the electronic unit is generated ((H) of FIG. 2), and, for example, a DC voltage of 5 V passes through a diode 120 to charge the capacitor C121 serving as an electricity accumulating section ((I) of FIG. 2), and a voltage is sent to the control microcomputer 122. A capacitor C124 is also charged through a resistor 125.

Immediately thereafter, a voltage sent to a signal terminal $T_3$ of the control microcomputer 122 is changed from an L level to an H level ((E) of FIG. 2) when the second instantaneous-operation switch 113 performs an inversion operation from the on state to the off state. With this signal being input, the control microcomputer 122 sends a signal from a signal terminal $T_2$ to the electromagnetic-relay coil 117 ((F) of FIG. 2) to control the electromagnetic-relay coil 117 such that the relay contacts 114 are turned on (closed) ((G) of FIG. 2). Even after the instantaneous-operation switch 112 is turned off, the electronic unit maintains an operation state with the power supply being on.

In this state, when the user operates the remote controller 126 at the point $t_2$ of time to press a main-power-supply off button thereon, a power-supply-stop-instruction signal (a standby signal) is transmitted. This signal is input to the control microcomputer 122 at a terminal $T_4$. The control microcomputer 122 decodes the signal received by the light-receiving section 127. When the control microcomputer 122 determines that the signal indicates a power-supply-stop instruction, it controls the electromagnetic-relay coil 117 to turn off (open) the contacts 114. Therefore, the power-supply circuit is completely separated from the AC power, and becomes a standby state. Even in the standby state, the control microcomputer 122 receives electric power from the electricity accumulating section formed of the capacitor C121 and maintains the standby state. While the main-power-supply switch 111 is on ((C) of FIG. 2), since no power is supplied from the AC power, power consumption is zero.

When the user operates the remote controller 126 at the point $t_4$ of time to press a main-power-supply on button thereon, a power-supply-connection-instruction signal is transmitted. The control microcomputer 122 decodes the signal received by the light-receiving section 127. When the control microcomputer 122 determines that the signal indicates a power-supply-connection instruction, it controls the electromagnetic-relay coil 117 to turn on (close) the contacts 114. The power-supply circuit is connected to the AC power 101, and the electronic unit is set to an operation state. The electricity accumulating section is charged so as to have a sufficient potential in the operation state.

When the user operates the remote controller 126 at the point $t_6$ of time to press the main-power-supply off button ((A) of FIG. 2) thereon, the control microcomputer 122 determines that the signal indicates a power-supply-stop instruction, and controls the electromagnetic-relay coil 117 to turn off (open) the contacts 114. The power-supply circuit is completely separated from the AC power, and enters a standby state. Even in the standby state, in the same way as described above, the control microcomputer 122 receives electric power ((I) of FIG. 2) from the electricity accumulating section formed of the capacitor C121 and maintains the standby state. Also in this case, while the main-power-supply switch 111 is on ((C) of FIG. 2), power consumption is zero.

When the standby state continues long, the capacitor C121 of the electricity accumulating section is gradually discharged as shown in (I) of FIG. 2, and its output voltage decreases. The control microcomputer 122 continues to maintain the standby state until the output voltage is reduced to a predetermined potential. In this case, when the capacitor C121 has a large capacitance, the control microcomputer 122 maintains the standby state for several tens of hours. The voltage detecting section 123 detects the voltage sent from the electricity accumulating section, and sends a digital signal to the control microcomputer 122. When the digital value sent from the voltage detecting section 123 is equal to a driving-section-operation voltage $V_k$ or less (at the point $t_k$ of time in (I) of FIG. 2), the control microcomputer 122 controls the switch driving section 116 formed of the solenoid by the use of a signal terminal $T_1$ so as to drive the solenoid, to return the button 115 pushed to an on state to the original state, and to turn off the main-power-supply switch 111 (at the point $t_8$ of time in (C) of FIG. 2). The driving-section-operation voltage $V_k$ is set to a voltage immediately before the control microcomputer 122 becomes inoperative, and is set equal to or more than a voltage required for driving the solenoid of the driving section 116.

When the driving section 116 turns off the main power supply switch 111, the power-supply circuit is completely separated from the AC power source and does not consume any power. Therefore, a signal sent from the remote controller is not received. The user can recognize this state by the position of the push-latching button 115. To operate the electronic unit, the user needs to turn on again the display and power switch 110 manually.

The standby-state duration is determined by the capacitance of the capacitor C121 of the electricity accumulating section and its load current (flowing mainly through the light-receiving section 127 and the control microcomputer 122). When the capacitor C121 of the electricity accumulating section has a capacitance of 10 F, the driving-section-operation voltage is 3 to 5 V, and the load current is 100 μA, the duration is about 55 hours (about two days).

Figure 4:
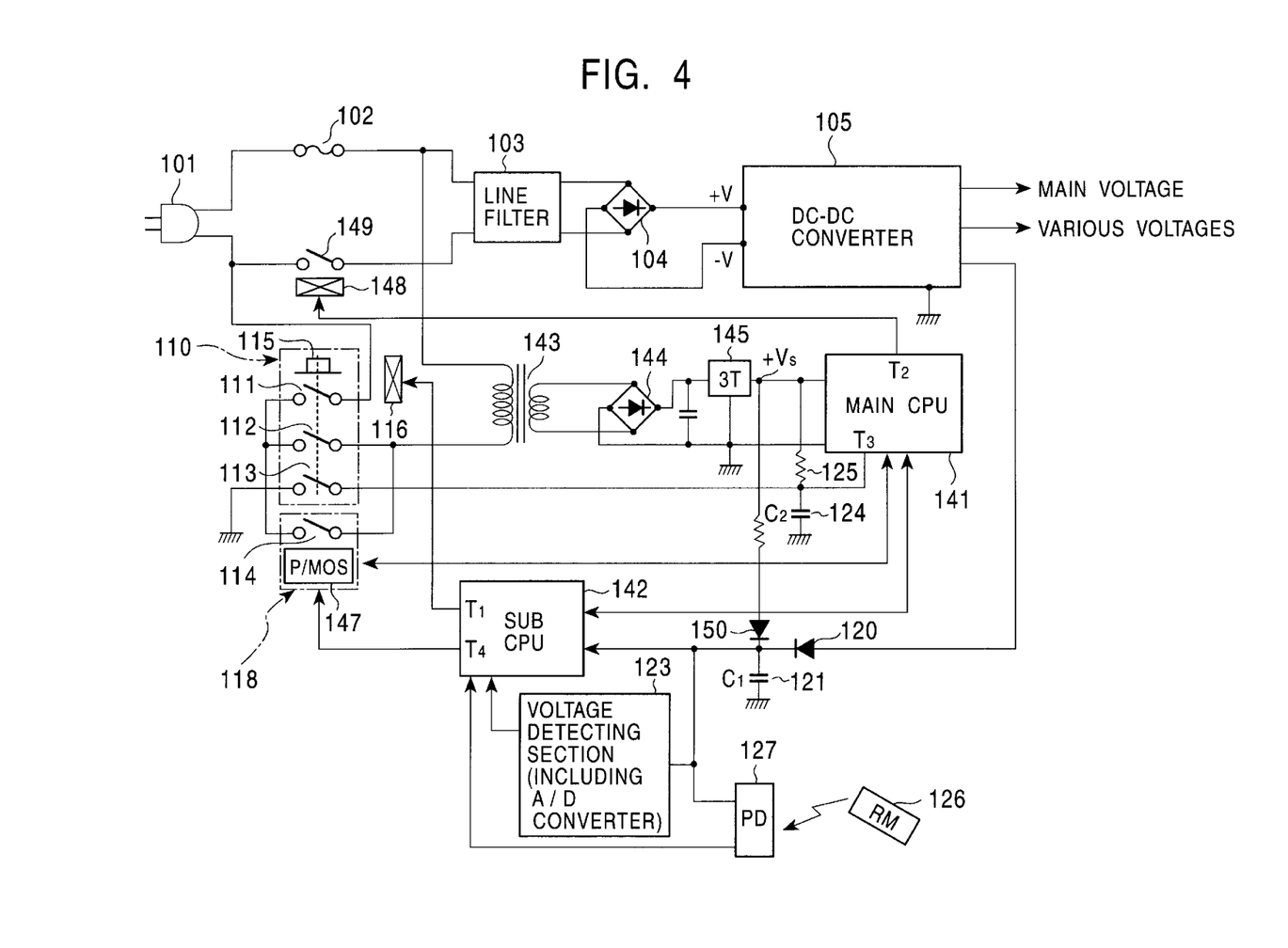
FIG. 4 is a circuit diagram of a power-supply apparatus according to a second embodiment of the present invention.

FIG. 4 is a circuit diagram of a power-supply apparatus according to a second embodiment of the present invention. The same symbols as those used in FIG. 1 are assigned to the same portions as those shown in FIG. 1, and detailed descriptions thereof will be omitted.

In the present embodiment, the power-supply apparatus includes a main control microcomputer to which power is supplied from a sub-power-supply apparatus and a sub standby microcomputer to which power is supplied from an electricity accumulating section in a standby state.

In FIG. 4, there is shown an AC-connection plug 101. The AC power is connected to a line filter 103 through a fuse 102 and a contact switch 149 controlled by an electromagnetic relay 148. Through a DC-DC converter having a main-power-supply function, a main voltage and various voltages are given to the electronic unit. A display and power switch 110 has the same structure as that in the first embodiment.

Also in this embodiment, when a push-latching button 115 is manually turned on, the main-power-supply switch 111 is turned on. At the same time, first and second instantaneous-operation switches 112 and 113 are turned on and are soon turned off. When the main-power-supply switch 111 and the first instantaneous-operation switch 112 are turned on, a voltage is generated at the secondary side of a transformer 143; a voltage (+Vs) is sent to a main control microcomputer 141 through a three-terminal regulator 145; and a capacitor C124 for generating an on/off detection voltage for the second instantaneous-operation switch 113 is charged through a resistor 125. When the instantaneous-operation switch 113 is turned off, the main control microcomputer 141 controls a photo MOS relay 147 by an H-level signal sent to $T_3$ so as to turn on (close) relay contacts 114. Even if the first instantaneous-operation switch 112 is turned off at this point of time, since the relay contacts 114 are turned on (closed), the voltage continues to be sent to the main microcomputer 141. In the present embodiment, the photo MOS relay is used. A relay to be used needs to be a semiconductor relay but is not limited to the current one. An electromagnetic relay may be used as in the first embodiment.

The main control microcomputer 141 detects a condition in which the second instantaneous-operation switch 113 has been turned on/off, by the voltage of the capacitor C124 applied to the signal terminal $T_3$. Then, the main control microprocessor 141 energizes an electromagnetic relay 148 through a signal terminal $T_2$ to turn on (close) contacts 149. When the contacts 149 are turned on (closed), a DC-DC converter 105 starts operating, generates various secondary DC voltages, and charges a capacitor C121 of an electricity accumulating section through a diode 120 by a part of the output voltages to set a sub control microcomputer 142 to an operation state. A voltage detecting section 123, a remote controller 126, and a light-receiving section 127 have the same functions as in the first embodiment. The sub control microcomputer 142 consumes less power than the main control microcomputer 141, and decodes a control signal sent from the remote controller 126 and controls the photo MOS relay 147.

In this state, when the user operates the remote controller 126 to press a power-supply off button thereon, a power-supply-stop-instruction signal (a standby signal) is transmitted. The sub control microcomputer 142 decodes the signal received by the light-receiving section 127. When the sub control microcomputer 142 determines that the signal indicates a power-supply-stop instruction, it sends a signal to the photo MOS relay 147 and to the main control microcomputer 141 to control the electromagnetic relay 148 to turn off (open) the relay contacts 114 and the electromagnetic-relay contacts 149. The main and sub power-supply sections are completely separated from the AC power, and become a standby state. In the standby state, the sub control microcomputer 142 receives electric power from the electricity accumulating section formed of the capacitor C121 and maintains the operation state. The main-power-supply switch 111 is kept turned on.

When a power-supply on signal is sent from the remote controller 126, the sub control microcomputer 142 sends an operation signal to the photo MOS relay 147 through a signal terminal $T_4$. The photo MOS relay 147 starts operating, the relay contacts 114 are turned on (closed), the voltage is sent to the main control microcomputer 141, an operation signal is sent to the electromagnetic relay 148 through a signal terminal $T_2$, the relay contacts 149 are turned on (closed), and the electronic unit enters an operation state.

When no signal is sent from the remote controller 126 and the standby state continues, the capacitor C121 of the electricity accumulating section continues to be discharged. Until the electricity accumulating section has a predetermined value or less, the sub control microcomputer 142 maintains the standby state. The voltage detecting section 23 detects the voltage sent from the electricity accumulating section, and sends a digital signal to the control microcomputer 142. When the digital value sent from the voltage detecting section 123 becomes equal to or less than a driving-section-operation voltage $V_k$, the control microcomputer 142 sends a driving signal to a switch driving section 116 formed of a solenoid through a signal terminal $T_1$ to drive the solenoid, to return the push-latching button 115 to the original position, and to turn off the power-supply switch 111. The driving-section-operation voltage $V_k$ is set to a voltage required to drive the solenoid of the driving section 116 or more.

When the driving section 116 turns off the power-supply switch 111, the main and sub power-supply circuits are completely separated from the AC power and no power is consumed. Therefore, a signal sent from the remote controller is not received. It is necessary to turn on the display and power switch 110 again to receive it as in the first embodiment.

As a modified embodiment of the embodiment shown in FIG. 4, a case in which an electricity accumulating section is intermittently charged will be described. When the power-supply switch 111 is on and the voltage detecting section 123 detects a condition in which the electricity accumulating section has the specified value $V_k$ or less, unlike the above-described case, a case may be formed such that the power-supply switch 111 is not turned off, the sub control microcomputer 142 operates the photo MOS relay 147 to turn on (close) the relay contacts 114 (without operating the electromagnetic relay 148), and the capacitor C121 of the electricity accumulating section is charged by a current flowing into the diode 150 through a resistor, caused by the voltage generated at the secondary side of the transformer 143.

When the sub control microcomputer 142 detects by a signal sent from the voltage detecting circuit 123 a condition in which charging has been achieved and the voltage has increased, the sub control microcomputer 142 controls the photo MOS relay 147 to turn off (open) the relay contacts 114 to disconnect the AC power and to set to a standby state. With such a structure, zero power consumption is not implemented, but the electronic unit is always in the standby state with a little power consumption by intermittent charging.

As another modified embodiment, a case will be described in which not the voltage $V_k$ only but two voltage monitoring levels, for example, $V_k$ and $V_{k1}$ ($V_k > V_{k1}$), are specified; when the voltage of the capacitor C121 of the electricity accumulating section becomes equal to or less than $V_k$ during a standby state, the relay contacts 114 are turned on (closed) in the same way as in the above embodiment; and if a power failure occurs, or the AC-power-connection plug 101 is disconnected, when the voltage of the capacitor C121 continues to be reduced because intermittent charging cannot be achieved and the voltage of the capacitor C121 becomes less than the specified value $V_{k1}$, the switch driving section 116 is driven to turn off the power-supply switch 111 to return the push-latching button 115.

When a latching relay (state holding relay) is used as the relay 147, and it is set to be turned on when the solenoid of the power-supply switch 111 is turned on, the instantaneous-operation switch 112 can be omitted.

When the solenoid-driving voltage is sent from a capacitor (which is charged at the same timing as the capacitor C121) other than the capacitor C121 of the electricity accumulating section to the switch driving section 116, a constant voltage is ensured irrespective of the voltage of the capacitor C121.

Figure 5:
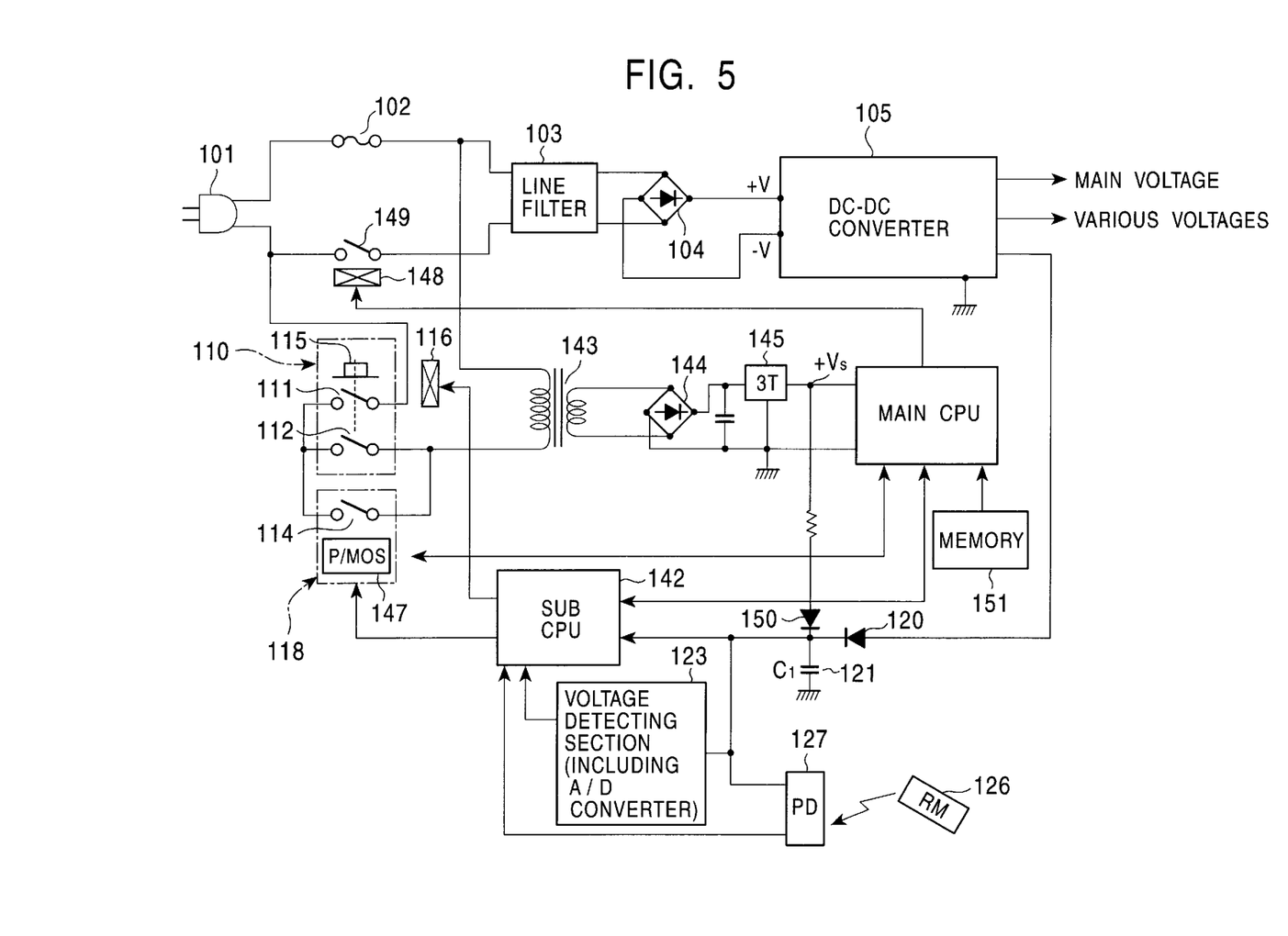
FIG. 5 is a circuit diagram of a power-supply apparatus according to a third embodiment of the present invention.

FIG. 5 shows a power-supply apparatus according to a third embodiment of the present invention. A non-volatile memory 151 stores the previous state of control of a main control microcomputer 141 when a voltage becomes equal to or less than a predetermined voltage during a standby state. Therefore, the second instantaneous-operation switch 113, and the capacitor C124 and the resistor 125 for detecting the on/off state of the switch can be omitted. When a main-power-supply switch 111 is turned on, if the main control microcomputer 141 reads the previous states from the memory 151 and sets the control to the previous states, the electronic unit can be returned to the original power-supply state in a power failure. In FIG. 5, the memory 151 is applied to the second embodiment. It can also be applied to the first embodiment.

What is claimed is:

1. A power-supply apparatus for an electronic unit, comprising:
    a power-supply section for supplying electric power to a load, the power-supply section being connected to an alternating power source through an electromagnetic relay and a power-supply switch provided with a button section for reporting a status change by moving in a predetermined direction and for opening and closing contacts and provided with a driving section for moving the button section in a direction opposite to said predetermined direction;
    an electricity accumulating section charged by the power-supply section for supplying electric power in a standby state in which the alternating power source is disconnected by the electromagnetic relay; and
    a control section for controlling the electromagnetic relay to enter the standby state and to receive electric power from the electricity accumulating section, when the control section decodes a received control signal and determines that the control signal indicates a power-supply-stop instruction, and for controlling the driving section of the power-supply switch according to a voltage sent from the electricity accumulating section to move the button section in the direction opposite from the present setting.

2. A power-supply apparatus for an electronic unit, comprising:
    a power-supply section for supplying electric power to a load, the power-supply section being connected to an alternating power source through an electromagnetic relay and a power-supply switch provided with a button section for reporting a status change by moving in a predetermined direction and for opening and closing contacts and provided with a driving section for moving the button section in a direction opposite to said predetermined direction;
    an electricity accumulating section charged by the power-supply section for supplying electric power at a standby state in which the alternating power source is disconnected by the electromagnetic relay;
    an A-D conversion section for converting a voltage sent from the power-supply section or the electricity accumulating section to a digital value; and
    a control section for controlling the electromagnetic relay to enter the standby state and to receive electric power from the electricity accumulating section, when the control section decodes a received control signal and determines that the control signal indicates a power-supply-stop instruction, and for controlling the driving section of the power-supply switch according to the converted digital value to move the button section in the opposite direction.

3. The power-supply apparatus for an electronic unit according to one of claims 1 or 2, further comprising:
    a first instantaneous-operation switch connected in parallel to contacts of the electromagnetic relay, for closing contacts thereof only for a predetermined time period in an interlocking manner when the power-supply switch is turned on and for supplying the alternating power source to the power-supply section; and
    a second instantaneous-operation switch for closing contacts thereof only for a predetermined time period in an interlocking manner when the power-supply switch is turned on and for sending a predetermined voltage to the control section,
    wherein, when the control section receives the predetermined voltage, the control section controls the electromagnetic relay to supply the alternating power source to the power-supply section instead of by the first instantaneous-operation switch.

4. The power-supply apparatus for an electronic unit according to one of claims 1 or 2, further comprising:
   a storage section for storing and holding a control state of the control section, the control state being written therein when a voltage from the electricity accumulating section becomes equal to or less than a predetermined value,
   wherein, when the alternating power source is supplied through the first instantaneous-operation switch and the supply of electric power from the power-supply section to the load starts, the control section controls the electromagnetic relay according to the control state read from the storage section to connect the alternating power source to the power-supply section instead of by the first instantaneous-operation switch.

5. A power-supply apparatus for an electronic unit, comprising:
   a main power-supply section for supplying electric power to a load, the main power-supply section being connected to an alternating power source through a first relay and a power-supply switch provided with a button section for reporting a status change by moving in a predetermined direction and for opening and closing contacts and provided with a driving section for moving the button section in a direction opposite to the predetermined direction;
   an electricity accumulating section charged with electric power from the main power-supply section;
   a sub power-supply section connected to an external power source through a second relay, the sub power-supply section supplying electric power to the electricity accumulating section when the supply of the alternating power source to the main power-supply section is blocked by the first relay; and
   a control section for controlling the first relay to stop the supply of the alternating power source to the main power-supply section when the control section decodes a received control signal and determines that the control signal indicates a power-supply-stop instruction, for receiving electric power from the electricity accumulating section, and for controlling the second relay according to a voltage sent from the electricity accumulating section to control the supply of electric power from the sub power-supply section in order to intermittently charge the electricity accumulating section.

6. A power-supply apparatus for an electronic unit, comprising:
   a main power-supply section connected to an alternating power source through a first relay and a power-supply switch provided with a button section for reporting a status change by moving in a predetermined direction and for opening and closing contacts and provided with a driving section for moving the button section in a direction opposite to the predetermined direction;
   an electricity accumulating section charged with electric power sent from the main power-supply section;
   a sub power-supply section connected to an external power source through a second relay, the sub power-supply section supplying electric power to the electricity accumulating section when the supply of the alternating power source to the main power-supply section is blocked by the first relay;
   an A-D conversion section for converting a voltage sent from the electricity accumulating section to a digital value; and
   a control section for controlling the first relay to stop the supply of the alternating power source to the main power-supply section when the control section decodes a received control signal and determines that the control signal indicates a power-supply-stop instruction, for receiving electric power from the electricity accumulating section, and for controlling the second relay according to the converted digital value to control the supply of electric power from the sub power-supply section in order to intermittently charge the electricity accumulating section.

7. The power-supply apparatus for an electronic unit according to one of claims 5 or 6, wherein the control section controls the driving section to move the button section of the power-supply switch to the opposite direction when the voltage sent from the electricity accumulating section decreases below a value required to control the second relay.

8. The power-supply apparatus for an electronic unit according to one of claims 5 or 6, further comprising:
   a storage section for storing and holding a control state of the control section, the control state being written therein when the voltage sent from the electricity accumulating section becomes equal to or less than a predetermined value; and
   a first instantaneous-operation switch connected in parallel to contacts of the second relay, for closing the contacts in an interlocking manner only at a moment when the power-supply switch is turned on, to supply a power source to the sub power-supply section,
   wherein, when the control section receives the predetermined voltage, the control section reads the control state stored and held by the storage section and controls the second relay to supply the alternating power source to the sub power-supply section instead of by the first instantaneous-operation switch.

9. The power-supply apparatus for an electronic unit according to one of claims 5 or 6, wherein the control section comprises:
   a first control section to which electric power is supplied from the sub power-supply section, for controlling the first relay; and
   a second control section for decoding a received control signal and for controlling the second relay.

10. The power-supply apparatus for an electronic unit according to claim 9, wherein a power consumption of the second control section is less than a power consumption of the first control section.

* * * * *